United States Patent
Leu et al.

(10) Patent No.: US 6,571,737 B1
(45) Date of Patent: Jun. 3, 2003

(54) DEVICE FOR MANAGING FISH-RAISING CIRCULATORY WATER

(76) Inventors: Sheng-I Leu, No.26, Lane 25, Wen-Heng 1st Rd, Kaohsiung City (TW); Guin-I Leu, No.26, Lane 25, Wen-Heng 1st Rd, Kaohsiung City (TW); Shun-dar Lin, 3012, W. Alan Ct., Peoria, IL (US) 61615; Shu-Ching Huang, 8F, No.76, Fen-Yang Rd, San-Min District, Kaohsiung City (TW)

( * ) Notice: Subject to any disclaimer, the term of this patent is extended or adjusted under 35 U.S.C. 154(b) by 0 days.

(21) Appl. No.: 10/101,066

(22) Filed: Mar. 20, 2002

(51) Int. Cl.$^7$ ................................................ A01K 63/00
(52) U.S. Cl. ....................................................... 119/261
(58) Field of Search ................................ 119/261, 215, 119/217, 200, 260

(56) References Cited

U.S. PATENT DOCUMENTS

| | | | | |
|---|---|---|---|---|
| 3,661,262 A | * | 5/1972 | Sanders | 119/227 |
| 3,892,200 A | * | 7/1975 | Ramsauer | 119/256 |
| 4,043,299 A | * | 8/1977 | Birkbeck et al. | 119/227 |
| 5,353,745 A | * | 10/1994 | Fahs, II | 119/226 |
| 5,732,654 A | * | 3/1998 | Perez et al. | 119/204 |
| 5,947,057 A | * | 9/1999 | Perez et al. | 119/211 |
| 5,961,831 A | * | 10/1999 | Lee et al. | 119/204 |
| 6,056,873 A | * | 5/2000 | Hartley et al. | 119/226 |
| 6,382,134 B1 | * | 5/2002 | Gruenberg et al. | 119/215 |

* cited by examiner

Primary Examiner—Thomas Price
(74) Attorney, Agent, or Firm—Troxell Law Office PLLC

(57) ABSTRACT

A device for managing the fish-raising circulatory water includes a water-storing tank, a filter, an activated carbon filter, a critical filter, a powerful oxidizing device and an ozone sterilizing device, possible to supply raising water of the best quality according to various requirements, and able to check and test the PH value and the amount of oxygen of the fish-raising water by way of a store barrel connected to the critical filter.

2 Claims, 5 Drawing Sheets

DEVICE FOR MANAGING FISH-RAISING CIRCULATORY WATER

BACKGROUND OF THE INVENTION

This invention relates to a device for-managing the fish-raising circulatory water, particularly to one possible to economize water supply, ensure environmental safety, increase fish-raising density and growth rate, and elevate profit of raising fish.

Conventionally, underground water (fresh water) and seawater are blended into fish-raising water of a proper proportion and then poured into a fishpond or an aquarium to match with the proportion of purity value and specially designated PH value of fish-raising water so as to let fish, shrimps and the like in a fishpond grow effectively.

However, a conventional fish raising process has the following defects.

1. A fish-raising area is comparatively small and fish-raising density is excessively high, so the speed of natural purification of raising water is slower than that of deterioration of raising water. In general, the raising water in a fishpond or in an aquarium has to be fully replaced, when the fish-raising water deteriorates or becomes soiled (i.e. the raising water not conforming to the proportion of purifying value to PH value), consequently wasting time and labor, and costing too much expenditure. Further, to lessen the cost in getting a great amount of seawater, a fishpond has to be located near a seashore in order to get seawater easily, and to lower raising cost and to let fish or shrimps raised effectively, fresh water used for raising fish should be nearly all underground water, thus easily resulting in geologic strata sinking, and seawater invading land to cause floods due to excessive pumping of underground water.

2. Generally, fish-raising water is fully replaced after ending raising fish for a period of time in order to cut down fish-raising costs. Thus, the excretion of fish, shrimps and the like, or decayed fish, shrimps and plants will sink down on the bottom of a fishpond to produce poisonous substance and gas (such as afloat ammonium nitrogen or nitrite nitrogen) through bacteria decomposition, rendering the fish and shrimps in the fishpond sick or dead. Especially, during the change of the wind direction or weather, the poisonous substances, bacteria, marsh gas, poisonous gas and the like hoarding at the fishpond bottom will float upward due to geothermal heat, poisoning the creatures being raised in the fishpond, and even seriously causing their death in a great amount. Under such a condition, it is hard to heighten fish-raising density and growth rate.

SUMMARY OF THE INVENTION

The objective of the invention is to offer a device or managing fish-raising circulatory water, possible to save water, promote environmental safety, and elevate fish-raising density and growth rate as well as the profit of raising fish.

The device of this invention includes a water-storing tank, a filter, an activated carbon filter, a critical filter, a powerful oxidizing device and an ozone-sterilizing device, able to supply fish-raising water of the best quality to a fishpond according to various requirements. Besides, a storing barrel is connected to the critical filter for checking and testing the PH value and the amount of oxygen of the fish-raising water and then properly adjusting the density of the fish-raising water so as to supply the best raising water to a fishpond or an aquarium.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
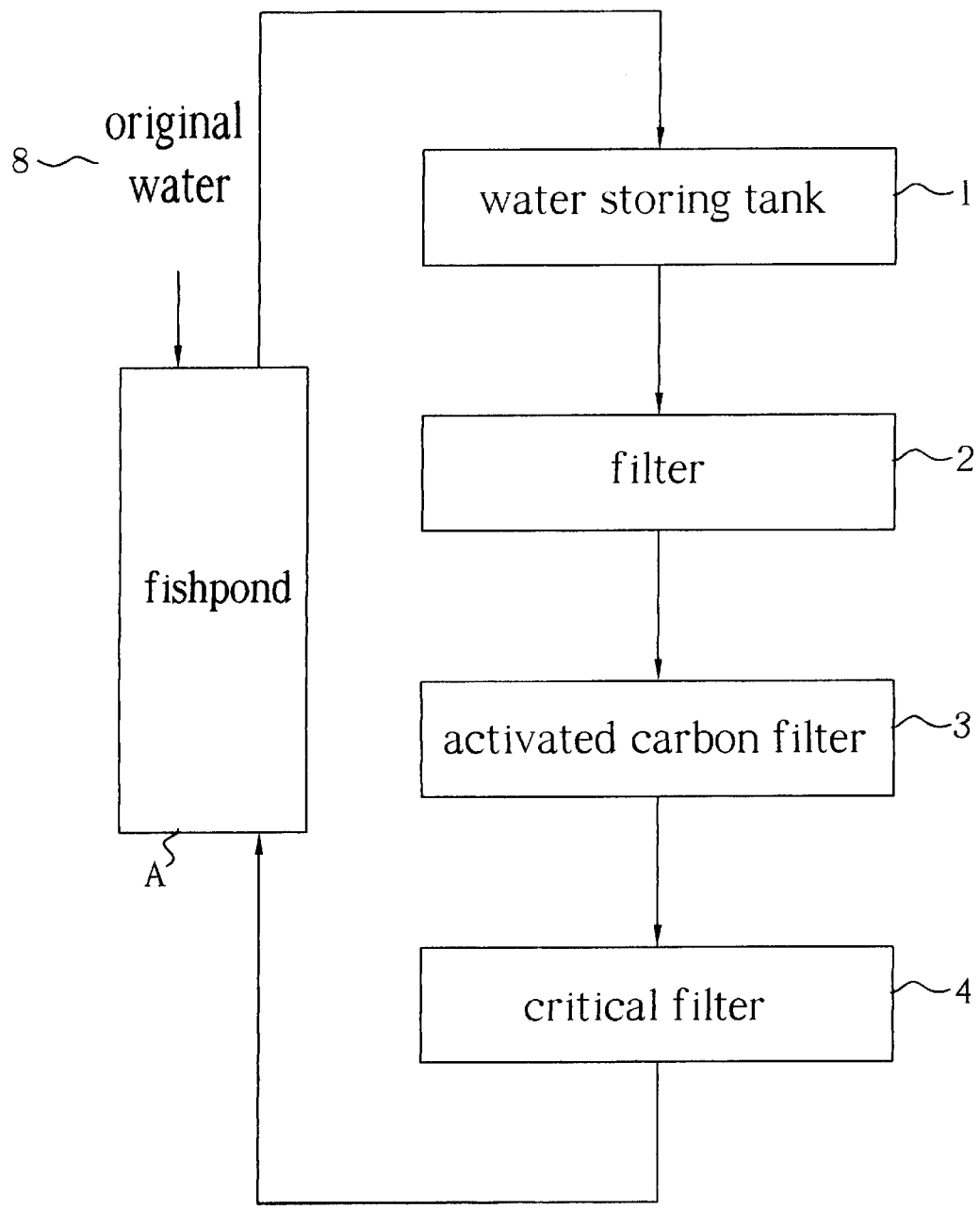
FIG. 1 is a flow chart of a first filtering device in the present invention.

A preferred embodiment of a first filtering device in the present invention, as shown in FIG. 1, includes a water storing tank 1, a filter 2, an activated carbon filter 3 and a critical filter 4 as main components combined together.

The water storing tank 1 is provided in a fishpond A (or an aquarium) or at its periphery for storing fish-raising water by blending underground water (fresh water) with seawater, and for storing dirty water of the fishpond A or the aquarium.

The filter 2 is installed behind the water storing tank 1 for pumping out the fish-raising water stored in the water storing tank 1 and removing bad substances inside such as comparatively large grains of soiled mud, limestone, irony substance or other heavy metals so as to purify raising water by the filtering materials filled in it. The filtering materials of the filter 2 consist of rough sands, fine sands and charcoal dregs orderly filled inside for filtrating and eliminating rough, medium and fine bad substances layer by layer.

The activated carbon filter 3 filled with activated carbon is provided behind the filter 2 for eliminating odor, flavor, color and poison to clean the raising water.

The critical filter 4 is installed behind the activated carbon filter 3 for filtrating comparatively fine impurities and getting rid of harmful substances (like nitrogen) in raising water to heighten water quality and supply a fishpond A (or an aquarium) with the cleanest raising water. The critical filter 4 is provided with filtering membrane or special filtrating material for removing or reducing afloat nitride such as ammonium nitrogen (N2) and nitrite nitrogen (N3) easily causing fish, shrimps and the like to become ill or dead in raising water, once more effectively elevating the quality of raising water.

When the raising water in a fishpond A (or an aquarium) deteriorates and becomes soiled (i.e. raising water not matching with the proportion of PH value), the soiled raising water will be stored together in the water storing tank 1 and then pumped into the filter 2 by a water pumping motor. Subsequently, the filter 2 carries on filtering this soiled raising water layer by later to remove a great amount of comparatively large grains of impurities. Next, the activated carbon filter 3 functions to get rid of the odor, flavor, color and poison of the raising water, and the critical filter 4 keeps on filtrating, and eliminating the harmful substances still remaining in raising water.

Lastly, ninety percent of completely filtrated raising water is sent back to the fishpond A (or the aquarium), and the rest can be filtrated again or pumped out of the fishpond, achieving effect of purifying raising water, which can be used in circulation.

Additionally, the fish-raising water of a fishpond A (or an aquarium) may unavoidably decrease in one period of raising fish and in the process of circulative filtration. In such case, original water 8 (underground water) blended with seawater in a proper proportion) can directly be poured into the fishpond A (or the aquarium) to supply what is insufficient.

Figure 2:
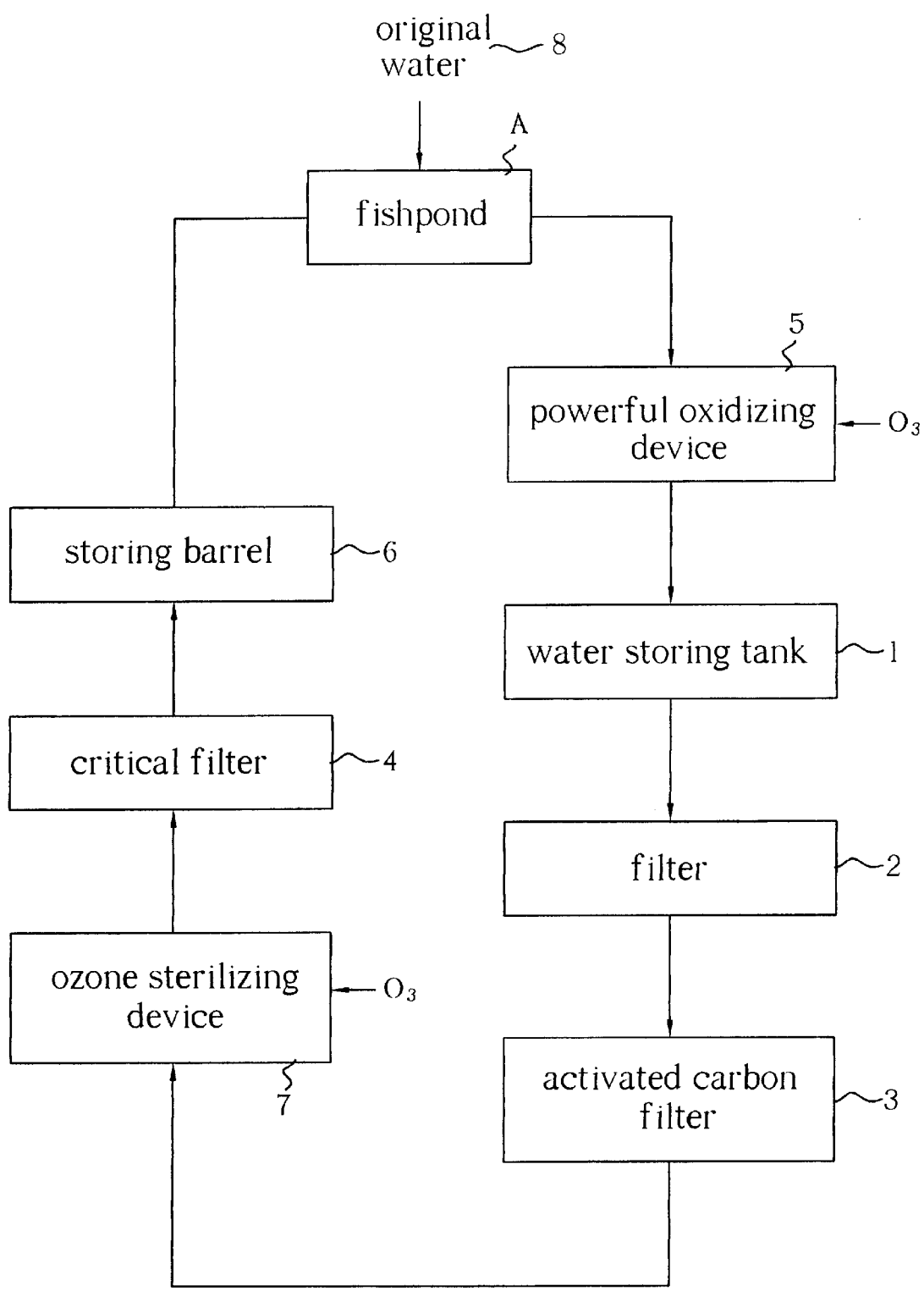
FIG. 2 is a flow chart of a second filtering device in the present invention.

Another preferred embodiment of a second filtrating device in the present invention, as shown in FIG. 2, includes a water storing tank 1, a filter 2, a critical filter 4, a powerful oxidizing device 5, a storing barrel 6 and an ozone sterilizing device 7 as main components combined together.

The powerful oxidizing device 5 is deposited before the water storing tank 1 for turning comparatively large grains of organic substances into small ones by the ozone mixed inside to be filtered easily so as to lighten the filtrating burden of subsequent filtrating devices of good precision and high prices.

In addition, after fish-raising water is managed in circulation for a period of time, its PH value and its amount of oxygen may gradually decrease, and in consequence it is liable to lower the fish-raising density. Therefore, a store barrel 6 is additionally provided behind the critical filter 4 for checking and testing the PH value and the oxygen amount of the fish-raising water so as to properly add sea water to adjust the PH value and the oxygen amount to a proper density.

Furthermore, an ozone sterilizing device 7 is installed before the critical filter 4 for pouring a definite amount of ozone($O_3$ or $O_2$) into the fish-raising water to let the ozone dissolving into the fish-raising water maintain an amount over 7.5 ppm for incessantly carrying on sterilizing during the period when the fish-raising water in the store barrel 6 or in the fishpond A is delayed to be managed. Thus, a definite amount of oxygen can be maintained in the fish-raising water, and the burden of the critical filter 4 can be lightened.

Furthermore, the filters used in the invention include a gravity-mode filter, a pressure-mode filter or a tube-mode filter.

Figure 3:
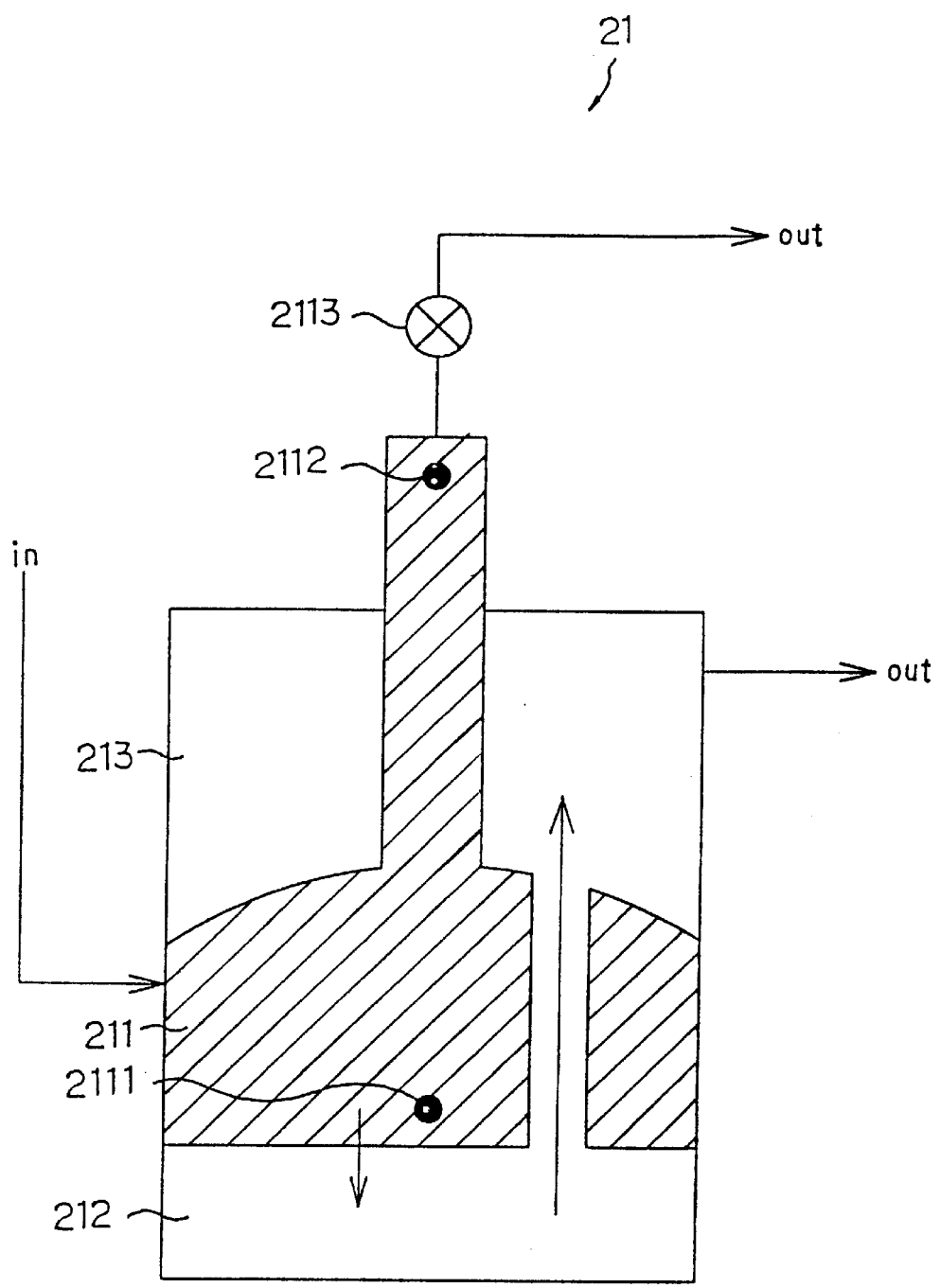
FIG. 3 is a cross sectional view of an embodiment of a gravity-mode filter in the present invention.

The gravity-mode filter 21, as shown in FIG. 3, consists of a filtering chamber 211, a first water storing chamber 212 and a second water-storing chamber 213. The filtering chamber 211 is installed inside with a low water-level sensor 2111, a high water-level sensor 2112 and a water-pumping device 2113.

When fish raising water is pumped into the gravity-mode filter 21, it is first filtered by the filtering material filled in the filtering chamber 211 to let soiled mud, limestone, iron or other heavy metals in the fish-raising water removed, and then stored in the first water-storing chamber 212. And when the fish-raising water of the first water storing chamber 212 overflows to the second water-storing chamber 213, it can timely flow out through a water guiding pipe into a next process.

But, when the filtering material of the filtering chamber 211 contains too much impurities, the amount of the fish-raising water flowing through the filtering chamber 211 is certainly larger than that of the fish-raising water flowing from the filtering chamber 211 into the first water-storing chamber 212, letting the water level in the filtering chamber 211 become higher and higher. In case -the water level in the filtering chamber 21 becomes high enough to reach the high water-level sensor 2112, the water pumping device 2113 is started to pump out the fish-raising water of the filtering chamber 211, and in the mean while this pumped water washes and cleanses the filtering material of the filtering chamber 211, because the impurities of the filtering material together with the stirred fish-raising water are pumped out at the same time. On the contrary, when the water level in the filtering chamber 211 falls below the low water-level sensor 2111, the water pumping device 2113 is turned off, and the gravity-mode filter 21 functions normally again.

Figure 4:
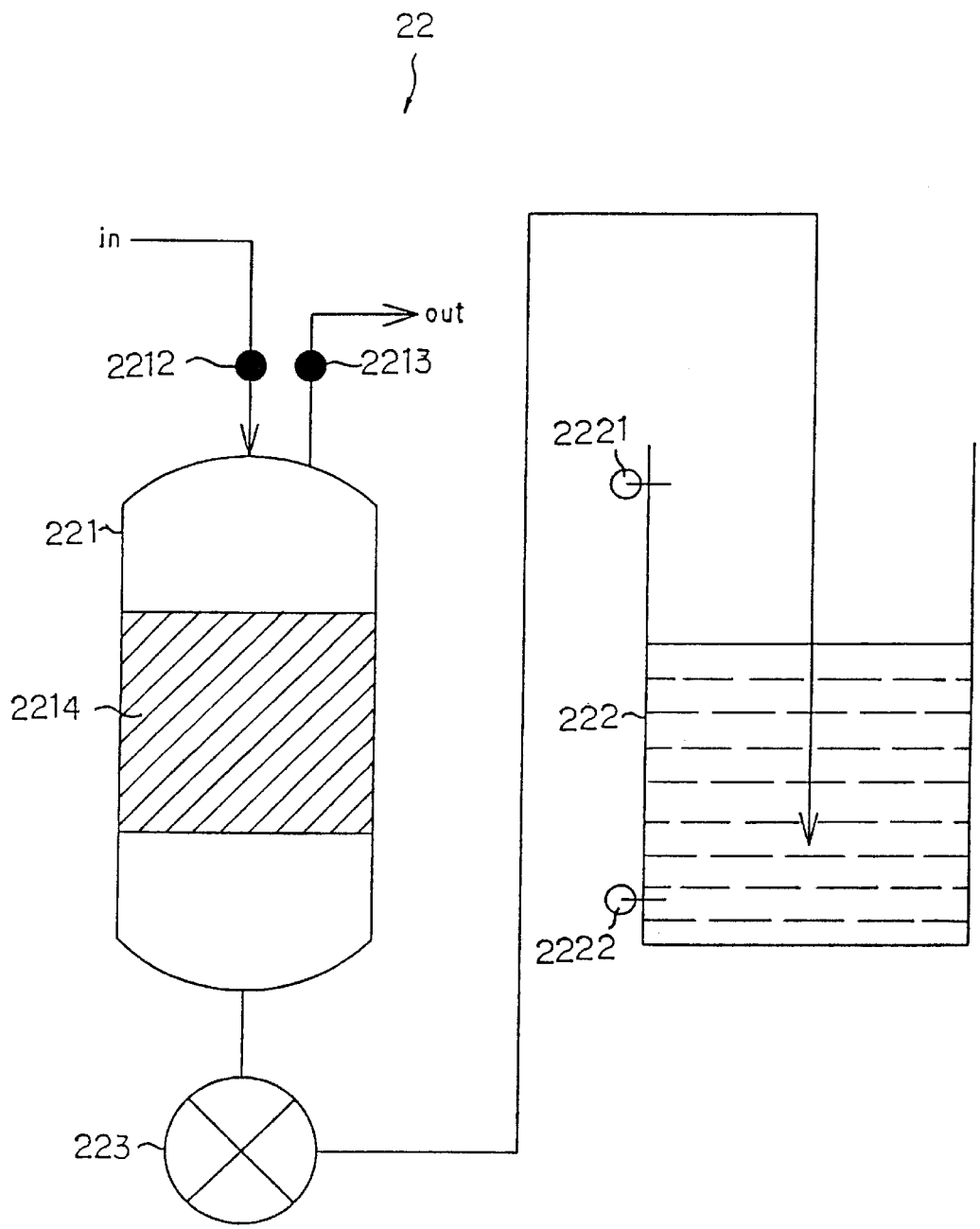
FIG. 4 is a cross-sectional view of the embodiment of a pressure-mode filter in the present invention.

The pressure-mode filter 22, as shown in FIG. 4, consists of a filter 221, a first switch 2212, a second witch 2213, a water-storing tank 222, a high water-level gauge 2221 a low water-level gauge 2222 and a water-pumping device 223 combined together.

The filter 221 is provided with a first switch 2212 at a water intake end having a water outlet installed with a second switch 2213 inside. The water-storing tank 222 is provided behind the filter 221, having a high water-level gauge 2221 at an upper location and a low water-level gauge 2222 at a lower location.

When fish-raising water is pumped into the pressure-mode filter 22, it is first filtered to eliminate its soiled mud, limestone, iron or other heavy metals layer by layer. After that, this filtered fish-raising water is pumped into, the water-storing tank 222 by the water-pumping device 223 and then gets to a next process through a water-guiding pipe.

But, when the water level in the water-storing tank 222 becomes high enough to reach the high water-level gauge 2221, the first switch 2212 at the water intake end is turned off, and the second switch 2213 at the water outlet is turned on to activate the water-pumping device 223 to pump the fish-raising water in the water-storing tank 222 to flow back to the filter 221 and then flow out of the water outlet of the filter 221. Under such a condition, the impurities of the filtering material 2214 together with the fish-raising water can flow out at the same time, because the fish-raising water is stirred to wash and cleanse the filtering material 2214 during pumping-out process.

On the contrary, when the water level in the water-storing tank 222 falls and reaches the low water-level gauge 2222, the first switch 2212 at the water intake end can be turned on, and the second switch 2213 can be turned off, letting the water pumping device 223 recover to operate and make the pressure-mode filter 22 function normally again.

Figure 5:
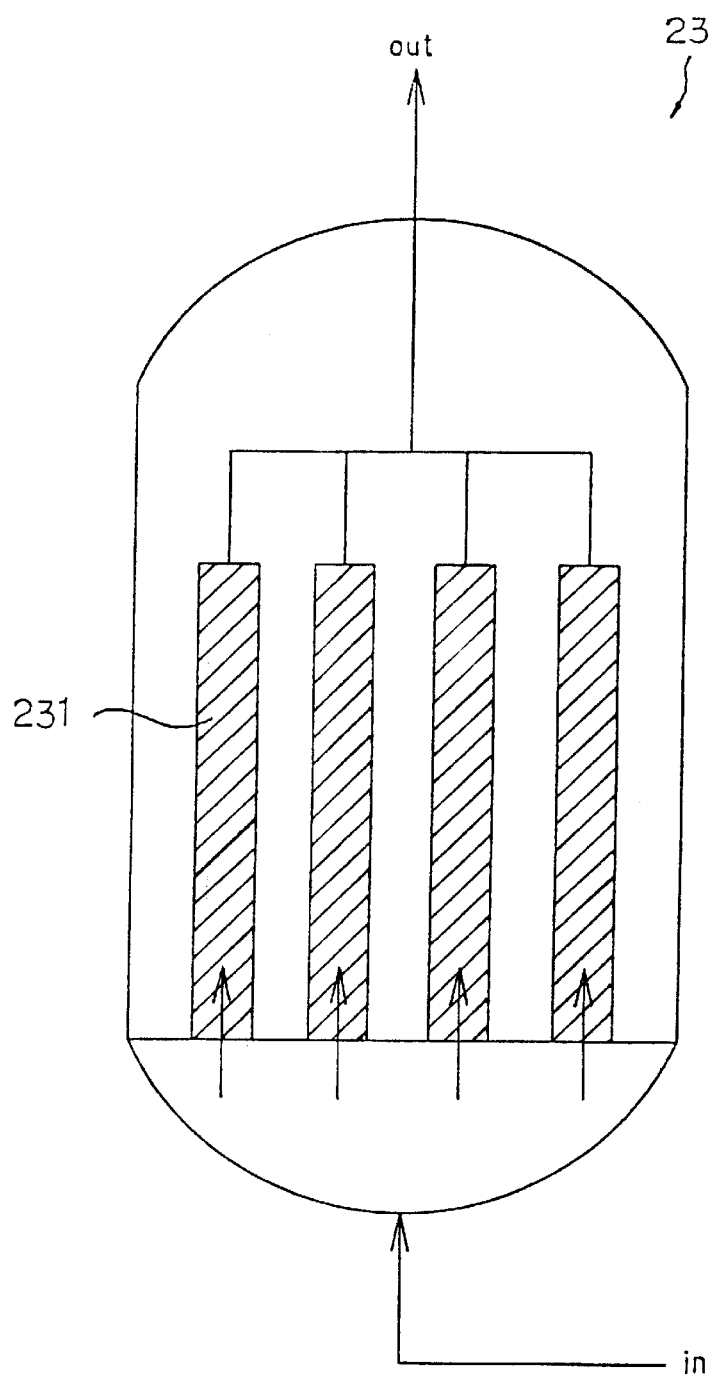
FIG. 5 is a cross-sectional view of the embodiment of a tube-mode filter in the present invention.

The tube-mode filter 23, as shown in FIG. 5, is composed of a proper number of filtrating tubes 231. In a filtering process, raising water is pumped into the interior of the tube-mod-e filter 23 and then flows into each filtering tube 231 to be filtered by the filtering material filled in the filtering tube 231 to eliminate solid mud, limestone, iron or other heavy metals layer by layer. Subsequently, the filtered fish-raising water is gathered together by the filtrating tubes 231 and then flows to a next process through a water-guiding pipe. These filtering tubes 231 can be taken out to be cleaned, or replaced with new ones so as to let the tube-mode filter 23 operate normally as usual again.

As can be, noted from the above description, the invention has the following advantages.

1. Fish-raising water of the best quality can incessantly be supplied to a fishpond or an aquarium in accordance with various requirements, greatly lowering the probability of changing fish-raising water, not restricting fish-raising locations, preventing geologic strata from sinking due to excessive pumping of underground water, and preventing seawater from invading land.
2. Soiled mud and impurities in the fish-raising water can fully be eliminated to prevent marsh gas and poison from generating. Further, the purity value and the PH value as well as the oxygen amount of the fish-raising water can be checked, tested and adjusted, maintaining the quality of fish-raising able to satisfy the standard, and largely increasing raising density and growth rate.

3. In a raising process, low probability of changing water, high fish-raising density and fast growth rate can not only save much cost dispensed in replacing raising water, but also increase volume of production of fish and shrimps or the like and elevate raising profit.

4. When raising water deteriorates or becomes soiled, its water quality turns acidic, with its PH value being around 6.0±0.5 and its oxygen amount around 4.5±0.5 ppm. But, after the raising water is filtered, the PH value of its purified water is around 7.5±0.5 and its amount of oxygen is around 7.5±0.5 ppm. It is quite obvious that the quality of filtered raising water is far better than that of unfiltered dirty raising water. Besides, the filtering materials in the filter, the activated carbon filter and the critical filter can timely be replaced.

While the preferred embodiments of the invention have been described above, it will be recognized and understood that various modifications may be made therein and the appended claims are intended to cover all such modifications that may fall within the spirit and scope of the invention.

We claim:

1. A system for managing fish-raising circulatory water for a fish pond or aquarium, and comprising:

a) a water storing tank for storing fish-raising water from the fish pond or aquarium;

b) an oxidizing device between the fish pond or aquarium and the water storing tank for mixing ozone with water taken from the fish pond or aquarium to reduce organic substances in the water supplied to the water storing tank;

c) a first filter positioned downstream of the water storing tank so as to filter organic substances and impurities from the water from the water storing tank, the first filter being a gravity mode filter and including:

i) a filtering chamber including a water inlet, a high water sensor and a low water sensor;

ii) a water pumping device in communication with the filtering chamber to pump water out of the filtering chamber when a water level reaches the high water sensor;

iii) a first water storing chamber located below the filtering chamber into which filtered water passes from the filtering chamber;

iv) a second water storing chamber located above the filtering chamber in communication with the first water storing chamber; and, v) a water outlet communicating with the second water storing chamber;

d) an activated carbon filter connected downstream of the first filter;

e) an ozone sterilizing device connected downstream of the activated carbon filter; and, f) a second filter between the ozone sterilizing device and the fish pond or aquarium for filtering fine impurities from the water.

2. The system for managing fish-raising circulatory water of claim 1 further comprising a water storing device between the second filter and the fish pond or aquarium to enable testing of a PH value and oxygen amount in the water.

* * * * *